(12) United States Patent
Walker

(10) Patent No.: US 7,111,143 B2
(45) Date of Patent: Sep. 19, 2006

(54) BURST MODE IMPLEMENTATION IN A MEMORY DEVICE

(75) Inventor: Robert Walker, Raleigh, NC (US)

(73) Assignee: Infineon Technologies AG, Munich (DE)

( * ) Notice: Subject to any disclaimer, the term of this patent is extended or adjusted under 35 U.S.C. 154(b) by 269 days.

(21) Appl. No.: 10/747,277

(22) Filed: Dec. 30, 2003

(65) Prior Publication Data

US 2005/0144371 A1   Jun. 30, 2005

(51) Int. Cl.
*G06F 12/00* (2006.01)

(52) U.S. Cl. .................. 711/170; 711/104; 365/222; 365/230

(58) Field of Classification Search ............. 711/104, 711/170; 365/222, 230; 360/222, 230
See application file for complete search history.

(56) References Cited

U.S. PATENT DOCUMENTS 5,307,320 A * 4/1994 Farrer et al. ........... 365/230.01
5,566,119 A * 10/1996 Matano ..................... 365/222
6,088,760 A * 7/2000 Walker et al. .............. 711/104

* cited by examiner

*Primary Examiner*—Matthew Kim
*Assistant Examiner*—Paul Schlie
(74) *Attorney, Agent, or Firm*—Edell, Shapiro & Finnan, LLC

(57) ABSTRACT

A memory device, such as a DRAM, includes a memory array that is accessible for writing data in and reading data out, and a command decoder that decodes input control signals to produce commands for accessing the memory array. The set of commands for controlling access to the memory device can include a first memory access command for accessing the memory array using a first burst length, a second memory access command for accessing the memory array using a second burst length, and a terminate command that terminates a current memory access. The memory device can include a mode register that stores memory access parameters associated with accessing the memory array, including the burst lengths. Access to the memory array is switchable between the first burst length and the second burst length without altering the memory access parameters in the mode register.

26 Claims, 5 Drawing Sheets

| OPERATION | CODE | CS# | WE# | REF# | A[20:0] | BA[2:0] |
|---|---|---|---|---|---|---|
| DEVICE DESELECT | NOP | H | X | X | X | X |
| MODE REGISTER SET | MRS | L | L | L | OPCODE | X |
| READ | READ | L | H | H | A | BA |
| WRITE | WRITE | L | L | H | A | BA |
| AUTO REFRESH | AREF | L | H | L | X | BA |

FIG.2

| OPERATION | CODE | CS# | WE# | REF# | A[20:0] | BA[2:0] |
|---|---|---|---|---|---|---|
| DEVICE DESELECT | NOP | H | L | L | X | X |
| MODE REGISTER SET | MRS | L | L | L | OPCODE | X |
| READ | READ | L | H | H | A | BA |
| READ-BURST | READB | H | H | H | A | BA |
| WRITE | WRITE | L | L | H | A | BA |
| WRITE-BURST | WRITEB | H | L | H | A | BA |
| TERMINATE | TERM | H | H | L | X | X |
| AUTO REFRESH | AREF | L | H | L | X | BA |

FIG.5

BURST MODE IMPLEMENTATION IN A MEMORY DEVICE

BACKGROUND OF THE INVENTION

1. Field of the Invention

The present invention relates to implementation of burst mode operation in a memory device.

2. Description of the Related Art

In electronic memory devices, burst mode generally refers to the operation of accessing multiple memory addresses within a memory array with a single command and address identifier in order to read or write a considerable amount of data rapidly. The amount of data accessed with each read or write command sent to the memory device is determined by the burst length, which corresponds to the number of data words to be read or written in a continuous stream, with one data word being accessed per successive clock edge. Without any burst mode capability, the burst length has a fixed value, and only a certain amount of data (e.g., a predetermined number of data words) is accessible with each read or write command. If each read or write command accesses only one or a few memory addresses, a lengthy sequence of commands would be necessary to read or write a large block of data, making memory access unacceptably cumbersome and slow.

Modern memory devices permit the burst length to be adjusted during operation to accommodate a range of memory access modes. For example, the burst length can be set to a small number where one or a few memory addresses need to be accessed and can be set to a larger number where a significant block of data, such as the entire contents of the memory array, must be accessed quickly. In typical memory devices, a mode register or comparable device maintains the current set of parameters by which data is written to and read from the memory array, including a burst length setting. To program the burst length to a particular value, a command must be sent to the memory device to adjust the mode register burst length setting to the appropriate value. This mode register set command must be sent to the memory device each time the burst length is changed, and with each change, access to the memory array must be temporarily halted to send the command and re-write the mode register burst mode setting. The need to program the mode register with each change of the burst length adds complexity to the controller responsible for generating and sending commands to the memory device. It would be desirable to implement a flexible burst mode capability in a memory device while minimizing the complexity of the memory access scheme and delays associated with changing the burst length.

SUMMARY OF THE INVENTION

In accordance with the present invention, an on-the-fly burst mode can be implemented in a memory device, wherein memory access (i.e., reading or writing) can be switched between different burst lengths without having to alter memory access parameters, such as the burst length, specified in a mode register associated with the memory array. This capability provides greater flexibility in accessing the memory device and in designing the controller that controls memory access, while reducing the complexity and number of states required in the controller.

In one aspect, a method of accessing a memory device includes: providing a set of commands for controlling access to the memory device, wherein the set of commands includes a first memory access command for accessing the memory device using a first burst length and a second memory access command for accessing the memory device using a second burst length; sending the first memory access command to the memory device to access the memory device using the first burst length; and sending the second memory access command to the memory device to access the memory device using the second burst length.

The first memory access command can be, for example, a read command or a write command. The second memory access command can be, for example, a read burst command or a write burst command having a greater burst length than that of the regular read command or write command. For example, the second burst length can correspond to a full page burst. The set of commands for controlling access to the memory device can also include a terminate command that terminates a current memory access.

Memory access parameters associated with memory access commands can be maintained in the memory device, and the set of commands can include a "set mode" command (e.g., a set mode register command) for configuring the memory access parameters. The memory access parameters can include, for example, the first and second burst lengths. Advantageously, however, the memory device is accessible by switching between the first memory access command using the first burst length and the second memory access command using the second burst length without sending a set mode command to the memory device to change the memory access.

In another aspect, a memory device includes: a memory array that is accessible for writing data into the memory array and reading data from the memory array; and a command decoder that decodes input control signals to produce commands for accessing the memory array, wherein the commands produced from the input control signals include: a first memory access command for accessing the memory array using a first burst length and a second memory access command for accessing the memory array using a second burst length.

The first memory access command can be, for example, a read command or a write command. The second memory access command can be, for example, a read burst command or a write burst command having a greater burst length than that of the regular read command or write command. For example, the second burst length can correspond to a full page burst. The set of commands for controlling access to the memory device can also include a terminate command that terminates a current memory access.

The memory device can include a mode register that stores memory access parameters associated with accessing the memory array, wherein at least the first burst length is specified by the memory access parameters in the mode register, and wherein access to the memory array is switchable between the first burst length and the second burst length without altering the memory access parameters in the mode register. The second burst length can also be specified by the memory access parameters in the mode register and can be configurable. The memory device can further include an address latch/counter module that receives an input address associated with the first memory access command or the second memory access command and supplies addresses to the memory array during memory access in accordance with a specified burst length. The memory device can be, for example, a dynamic random access memory (DRAM).

In yet another aspect, a memory device includes: means for storing data that is accessible for writing data in and reading data out; and means for processing input control signals to produce commands for accessing the means for storing data, wherein the commands produced from the input control signals include: a first memory access command for accessing the means for storing data using a first burst length and a second memory access command for accessing the means for storing data using a second burst length.

The first memory access command can be, for example, a read command or a write command. The second memory access command can be, for example, a read burst command or a write burst command having a greater burst length than that of the regular read command or write command. For example, the second burst length can correspond to a full page burst. The set of commands for controlling access to the memory device can also include a terminate command that terminates a current memory access.

The memory device can include means for storing memory access parameters associated with accessing the means for storing data, wherein at least the first burst length is specified by the memory access parameters, and wherein access to the means for storing data is switchable between the first burst length and the second burst length without altering the memory access parameters. The second burst length can also be specified by the memory access parameters and can be configurable. The memory device can further include means for receiving an input address associated with the first memory access command or the second memory access command and for supplying addresses to the means for storing data during memory access in accordance with a specified burst length. The memory device can be, for example, a dynamic random access memory (DRAM).

In still another aspect, a memory device includes: a memory array that is accessible for writing data into the memory array and reading data from the memory array; a mode register that stores memory access parameters associated with accessing the memory array; and a command decoder that decodes input control signals to produce commands for accessing the memory array, wherein the commands include: a first memory access command for accessing the memory array using a first burst length specified by the memory access parameters in the mode register; and a second memory access command for accessing the memory array using a second burst length, wherein access to the memory array is switchable between the first burst length and the second burst length without altering the memory access parameters in the mode register. The commands can include a read command and a write command that access the memory array using the first burst length, and a read burst command and a write burst command that access the memory array using the second burst length.

In still anther aspect, a controller for controlling a memory device includes: a memory management module that manages access to the memory device; and a command generator module that generates commands for accessing the memory module in accordance with the memory management module, wherein the commands include: a first memory access command for accessing the memory device using a first burst length and a second memory access command for accessing the memory array using a second burst length.

The first memory access command can be one of a read command and a write command, and the second memory access command can be one of a read burst command and a write burst command. The second memory access command can, for example, correspond to a full page burst. The commands generated by the command generator module can further include a terminate command that terminates a current memory access.

Memory access parameters associated with memory access commands can be maintained in the memory device, and the commands generated by the command generator module can further include a set mode command for configuring the memory access parameters. The first and second burst lengths can be among the memory access parameters configurable by the set mode command. However, the memory device can be accessible by switching between the first memory access command using the first burst length and the second memory access command using the second burst length without sending a set mode command to the memory device to change the memory access parameters.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 2 is a truth table illustrating a command set corresponding to the memory device shown in FIG. 1 for implementing burst mode operation in the memory device of FIG. 1.

FIG. 5 is a truth table illustrating an example of a command set for implementing on-the-fly burst mode in the memory device shown in FIG. 4.

DETAILED DESCRIPTION

Figure 1:
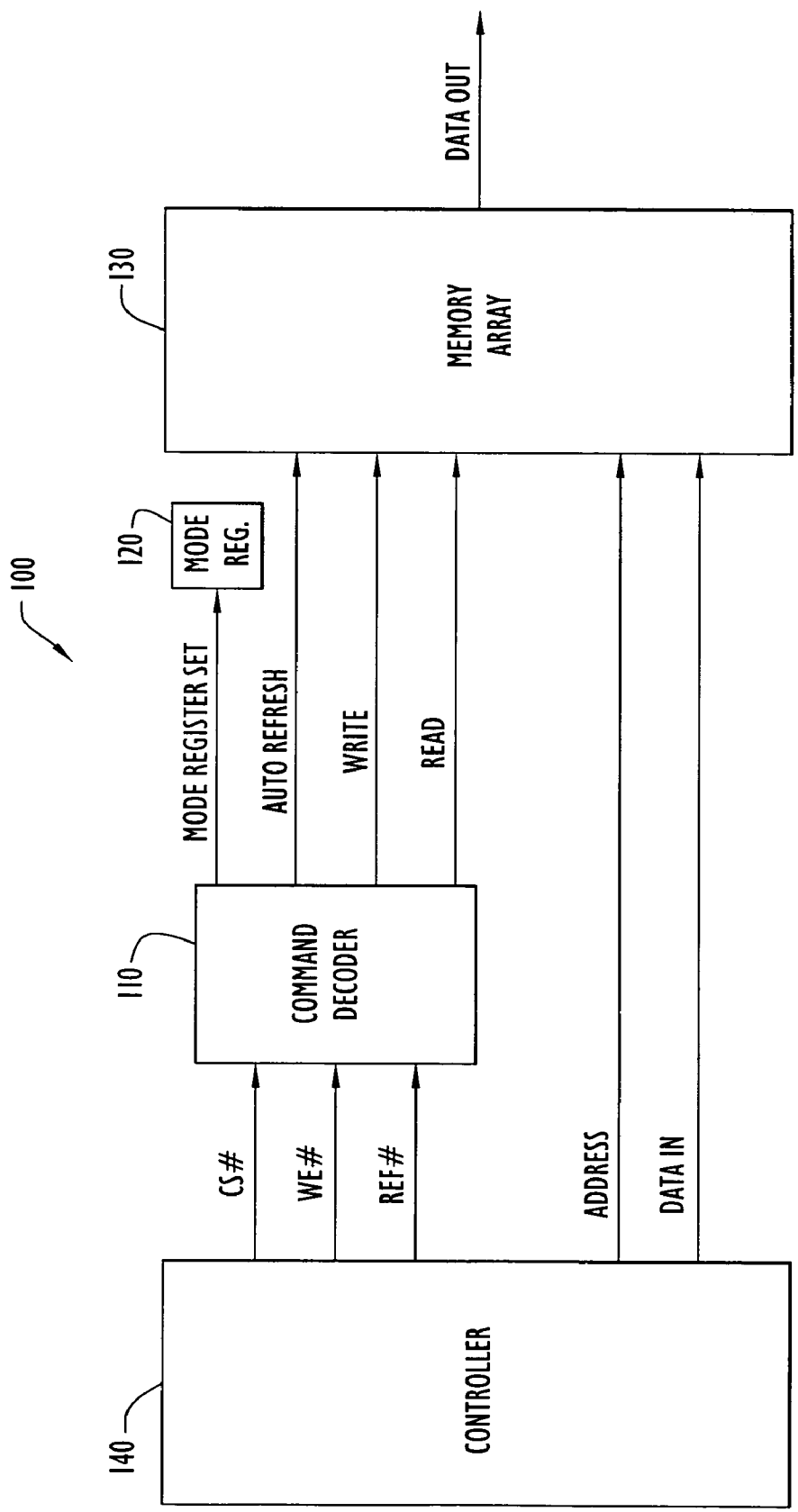
FIG. 1 is a block diagram of a memory device configured to implement burst mode operation in a conventional manner.

A conventional implementation of burst mode operation is described in connection with the block diagram of a memory device 100 shown in FIG. 1. Memory device 100 includes a command decoder 110, a mode register 120, and a memory array 130. Command decoder 110 receives operational commands from a controller 140 in the form of three control bits: CS# (chip select), WE# (write enable), and REF# (refresh), where combinations of the values of these control bits correspond to particular commands. Memory array 130 receives address information for reading and writing via an "Address" input and receives data to be written to the memory array via a "Data In" input. Data read from memory array 130 is supplied on a "Data Out" output. The input and output signals sent and received via the Address, Data In, and Data Out lines are typically multi-bit signals (e.g., address and data words).

Command decoder 110 essentially decodes the values of the input control bits to determine the command being sent from controller 140. The truth table shown in FIG. 2 provides an example of a command decoding scheme. Specifically, if the CS# bit is at a high level (H), the memory device is deselected (NOP), and no operation is performed regardless of the values of the other control bits. The combination of the CS#, WE#, and REF# bits all at a low level (L) specifies that the commanded operation is "Mode Register Set" (MRS). In this case, a mode register set command is sent from command decoder 110 to mode register 120, and mode register 120 is loaded with operation code (opcode) data, which can be supplied via the address input (or, optionally, the data input). By way of example, operational parameters that can be set in the mode register may include the burst length, drive strength, impedance calibration, and read/write latencies.

The combination of the CS# bit low (L) and the WE# and REF# bits high (H) corresponds to the "Read" operation. In this case, command decoder 110 sends a read command to memory array 130, and data is read from memory array 130 beginning at the address indicated via the address input. In the example shown in the table of FIG. 2, the address is specified by a three bit bank address (BA) and a twenty-one bit address (A). The combination of the CS# and WE# bits low (L) and the REF# bit high (H) corresponds to the "Write" operation. In response to this combination of command bits, command decoder 110 sends a write command to memory array 130, and data on the data input is written to memory array 130 beginning at the address indicated via the address input. Finally, the combination of the CS# and REF# bits low (L) and the WE# bit high (H) corresponds to the Auto Refresh (AREF) operation, and auto refresh is performed for the memory bank specified by the bank address.

Figure 3:
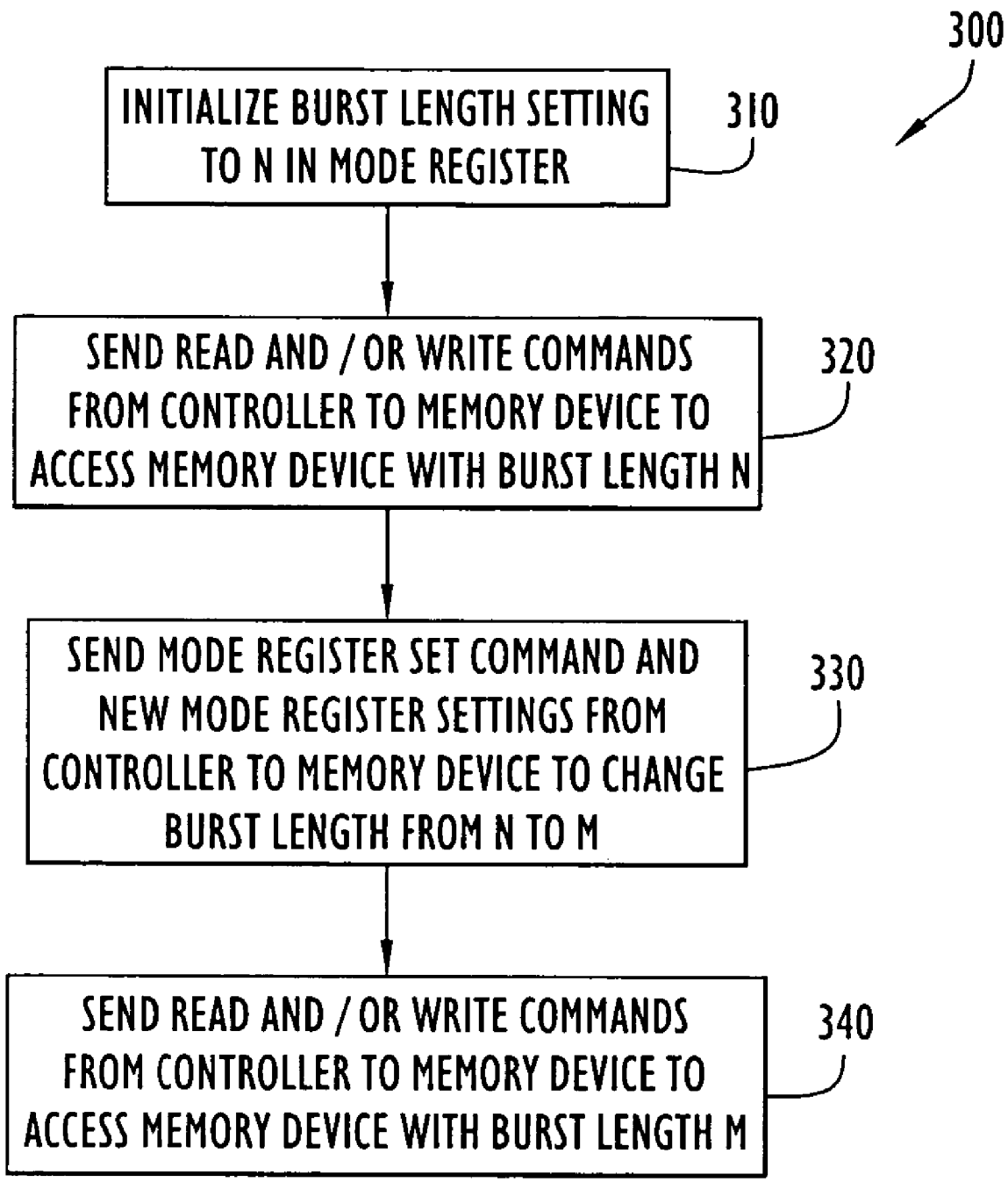
FIG. 3 is a functional flow diagram illustrating the sequence of commands required to perform burst mode in the memory device shown in FIG. 1.

An example of an implementation of burst mode operation using memory device 100 is described in connection with the flow chart of FIG. 3. To perform a burst mode operation, memory device 100 requires the contents of mode register 120 to be changed to perform reading or writing at different burst lengths. Specifically, the command set shown in the table of FIG. 2 permits the controller to specify a read operation or a write operation, which is carried out according to the burst length setting in the mode register 120. At initialization or power up, the burst length setting in mode register 120 can be set to a default value N (operation 310). Until the contents of mode register 120 are altered, subsequent read and write commands sent from controller 140 to memory device 100 cause memory array 130 to be accessed with the burst length N as specified by the mode register settings (operation 320). If memory device 100 is to be accessed using a different burst length (e.g., burst length M), controller 140 must send a mode register set command to memory device 100 together with new mode register settings in order to change the burst length from N to M (operation 330). After re-writing the contents of mode register 120, controller 140 can then send read or write commands to memory device 100 to access memory array 130 using a burst length M (operation 340). If, for example, the burst length is initially set to four (i.e., four data words) and a page burst is required, it is necessary first to perform a mode register set operation to change the burst length setting contents of the mode register. This requirement results in complexity in the controller as well as a delay in implementing the page burst.

Figure 4:
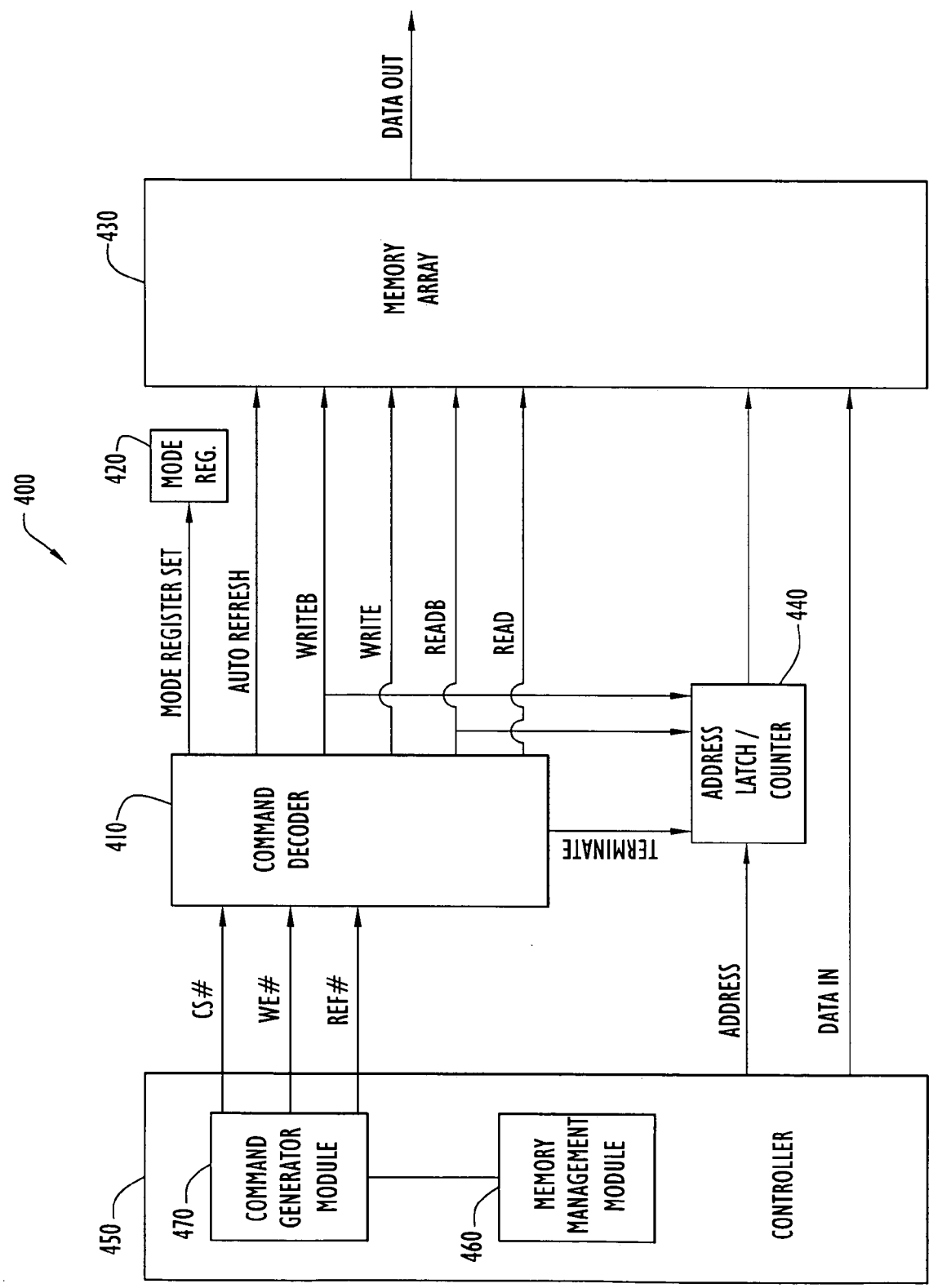
FIG. 4 is a block diagram of a memory device configured to implement on-the-fly burst mode.

Referring to FIG. 4, a memory device 400 according an exemplary embodiment can implement on-the-fly burst mode without having to change the contents of the mode register. As used herein, the designation "on-the-fly" refers to the capability to switch from accessing the memory device with one burst length to accessing the memory device with different burst length without changing the contents of the mode register that controls how the memory device is accessed. The architecture depicted in FIG. 4 is a conceptual diagram illustrating major functional units, and does not necessarily illustrate physical relationships. Memory device 400 can be, for example, a dynamic random access memory (DRAM), such as a double data rate (DDR) synchronous DRAM (SDRAM), or a reduced latency DRAM (RLDRAM). However, it will be understood that memory device 400 can represent virtually any type of memory device in which burst mode operation may be applicable, and the invention is not limited to any particular type of memory device.

Memory device 400 includes a command decoder 410, a mode register 420, a memory array 430 and an address latch/counter 440. Command decoder 410 receives operational commands from a controller 450 in the form of the three control bits previous described: CS#, WE#, and REF#, where combinations of the values of bits correspond to particular commands. Mode register 420 stores memory access parameters, such as the burst length associated with a normal read or write operation, drive strength, calibration, and latency. Optionally, the burst length associated with a burst read or write operation may also be stored in mode register 420, as will be described in greater detail below. Address latch/counter 440 receives the address input and supplies address information for reading and writing to memory array 430. Memory array 430 also receives data to be written to the memory via the data input (Data In). Data read from memory array 430 is supplied on the data output (Data Out). The command decoder 410, mode register 420 and address/latch counter 440 can be distinct units or modules or can be implemented jointly in a common operational module or unit, and, optionally, at least certain operations performed by these modules can be performed via software.

Controller 450 includes a memory management module 460 and a command generator module 470. These modules may be implemented in software, hardware or combinations thereof and may be implemented as a single operational module, unit or process, or as a plurality of distinct modules, units or processes. Memory management module 460 is responsible for managing control of memory device 400 (e.g., determining the sequence of commands that must be sent to the memory device to store and retrieve data efficiently, controlling memory access parameters, etc.) based on the memory needs of the processor or system that the memory device is supporting. Those skilled in the art will recognize that the particular configuration of memory management module 460 depends upon the system architecture and the requirements of the types of applications to be handled by the system. The command generator module 470 essentially generates the command signal or control bits that are sent to memory device 400 to carry out certain operations based on the operations specified by memory management module 460. An example of a command set generated by command generator module 470 will be described below in detail.

Command decoder 410 decodes the values of the input control bits to determine the command being sent from controller 450. The truth table shown in FIG. 5 provides an example of a command decoding scheme that enables a burst mode to be implemented without having to re-write the contents of mode register 420 (i.e., the memory access parameters). The commands and corresponding operations can be summarized as follows. If the CS# bit is high (H) and the WE# and REF# bits are low (L), the memory device is deselected (NOP), and no operation is performed. The combination of the CS#, WE#, and REF# bits all low (L)

specifies that the commanded operation is Mode Register Set (MRS). In this case, a Mode Register Set Command is sent from command decoder 410 to mode register 420, and mode register 420 is loaded with operation code (opcode) data, which can be supplied via the Address input (or, optionally, the data input).

Continuing with the command table of FIG. 5, the combination of the CS# bit low (L) and the WE# and REF# bits high (H) corresponds to the "Read" operation. In this case, command decoder 410 sends a read command to memory array 430, and data is read from memory array 430 beginning at the address indicated via the address input, and the data is supplied as output at the data output. As with the conventional example described in the table of FIG. 2, the address can be specified by a three bit bank address (BA) and a twenty-one bit address (A). However, it will be understood that the invention is not limited to any particular addressing scheme, and any suitable addressing scheme can be employed. The combination of the CS# and WE# bits low (L), and the REF# bit high (H) corresponds to the "Write" operation. Command decoder 410 sends a write command to memory array 430, and data received via the data input is written to memory array 330 beginning at the address indicated via the address input. As previously described, the read and write operations are performed in accordance with the burst length setting stored in mode register 420. The combination of the CS# and REF# bits low (L) and the WE# bit high (H) corresponds to the Auto Refresh (AREF) operation.

To enable read and write access with a burst length greater than the current burst length setting without having to alter the contents of the mode register, the set of operational commands can be expanded to include a "Read Burst" operation and a "Write Burst" operation. Specifically, the combination of the CS#, WE#, and REF# bits high (H) can correspond to the Read Burst operation (READB), and the combination of the CS# and REF# bits high (H) and the WE# bit low (L) can correspond to the Write Burst operation (WRITEB), as shown in the table of FIG. 5. Further, the combination of the CS# and WE# bits high (H) and the REF# bit low (L) can correspond to a "Terminate" operation (TERM). As used herein, the term memory access command(s) refers to the commands used for writing to or reading from the memory array. For example, the regular read or write command can be a first memory access command, and a read burst or write burst command can be a second memory access command.

The burst length associated with the read burst and write burst operations can have a value different from the burst length specified by the mode register for normal read and write operations. For example, the read burst and write burst operations can be configured such that a full page burst is executed in response to a read burst or write burst command. The burst length associated with the read burst and write burst operations can have a fixed value (e.g., a full page) or can be programmable. One implementation of a programmable burst mode burst length is to allocate certain bits in the mode register that specify the burst length in much the same manner as the burst length of a regular read or write operation, such that the burst mode burst length can be changed with an appropriate mode register set command. Note that, even in this configuration, once the burst lengths associated with the regular and burst access operations are set in the mode register, it is possible to switch between burst mode and non-burst mode (regular) access of the memory device on the fly without altering the contents of the mode register.

Referring again to FIG. 4, when a read burst operation is specified by the control bits, command decoder 410 sends a read burst (READB) command to memory array 430. The read burst command is also received by address latch/counter 440, which latches the input start address and performs a counter function that supplies a sequence of addresses to memory array 430 beginning with the start address in accordance with the burst mode burst length, such that a succession of words is read from memory array 430 and supplied on the data output. Similarly, when a write burst operation is specified by the control bits, command decoder 410 sends a write burst (WRITEB) command to memory array 430. The write burst command is also received by address latch/counter 440, which latches the input start address and performs a counter function that supplies a sequence of addresses to memory array 430 beginning with the start address in accordance with the burst mode burst length, such that a succession of words is written from the data input to memory array 430. Note that address latch/counter 440 provides a conceptual sense of accessing a sequence of addresses based off a start address in a burst mode. It will be understood, however, that the burst mode address sequencing can be implemented in any of a variety of ways (e.g., in memory array control logic), and the invention is not limited to implementations involving a separate latch/counter mechanism, such as that shown conceptually in FIG. 4.

As denoted by the separate command lines extending from command decoder 410 to memory array 430 in FIG. 4, the read burst and write burst commands are separate and distinct commands from the read and write commands. The burst length associated with the read burst and write burst commands is independent of the burst length setting in the mode register associated with the read and write commands. This expanded set of commands permits switching between regular access (i.e., that performed by the read and write operations) and burst mode without necessitating any changes to the mode register settings, simply by having the controller send (via the control bits) read or write commands versus read burst or write burst commands.

Figure 6:
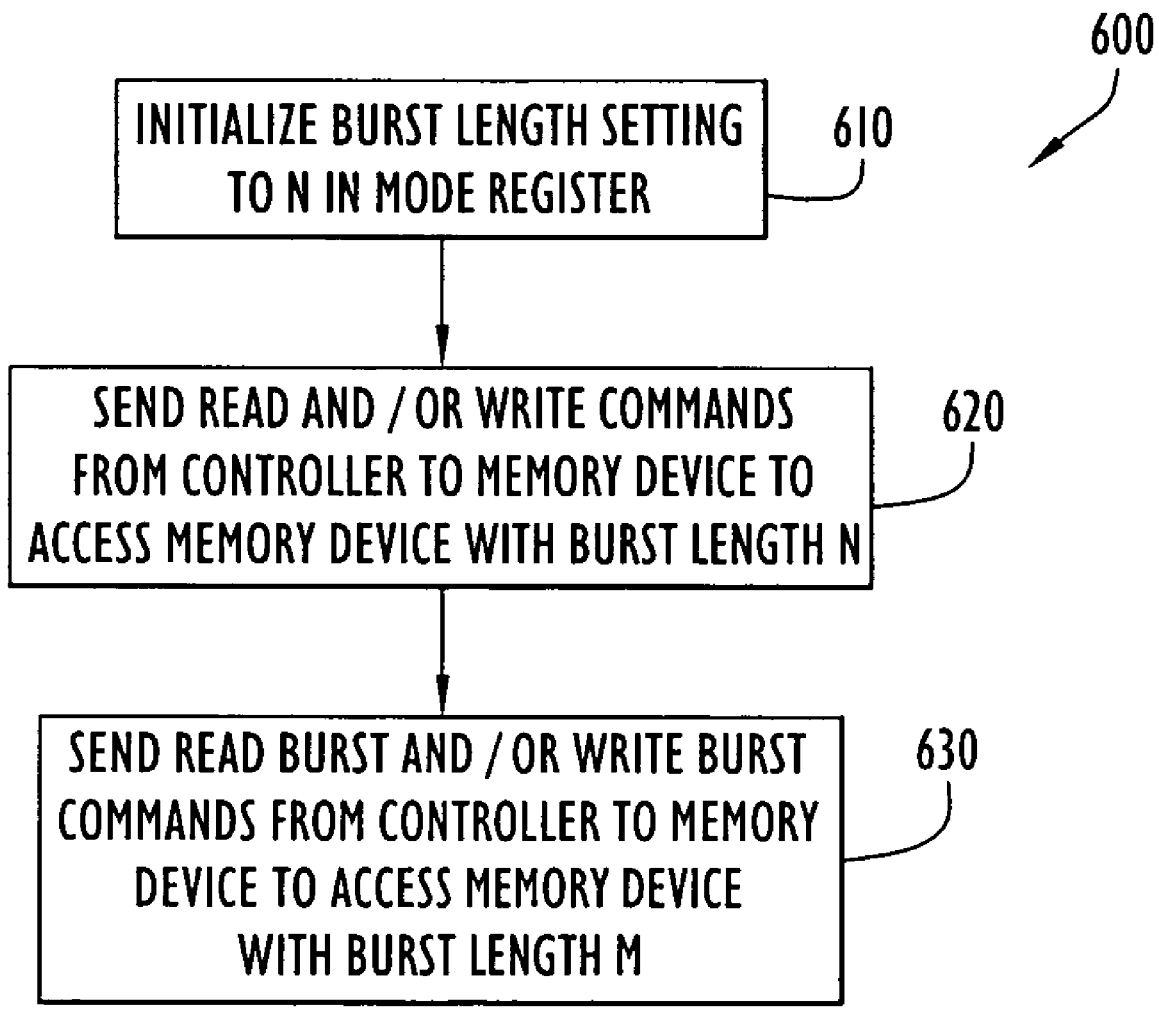
FIG. 6 is a functional flow diagram illustrating switching between different burst lengths in successive accesses to the memory device shown in FIG. 4 without re-writing the contents of the mode register.

More generally, the flow diagram shown in FIG. 6 illustrates the capability to switch between two different memory access burst lengths in the absence of the requirement to re-write the contents of the mode register. At initialization or power up, the burst length setting in mode register 420 associated with the read and write operations (non-burst) can be set to a default value N (operation 610). Optionally, the burst length M associated with the read burst and write burst operations can have a fixed value (e.g., full page) such that the read burst and write burst commands are always carried out with the same burst length. Alternatively, the burst length associated with the read burst and write burst operations can be configurable or programmable in much the same manner as the burst length associated with the read and write operations (e.g., a settable value in the mode register). Read and write commands sent from controller 440 to memory device 400 cause memory array 430 to be accessed with the burst length N as specified by mode register 420 (operation 620). To access memory device 400 with burst length M, controller 440 sends the control bits associated with the read burst or write burst commands to command decoder 410 (operation 620). No mode register set command is required between a read (or write) command and a successive read burst (or write burst) command and vice versa. Thus, for example, if the burst length is set to four and a page burst is required, the controller simply has to send one of the burst commands rather than the normal read or write command to effect the page burst.

Advantages of on-the-fly burst mode can be appreciated by considering some practical examples. When designing the memory device controller, one factor to consider is the smallest increment of data that needs to be transferred in order to get the data granularity required by the processor. The required granularity can generally be achieved by setting a default burst length to a low level, such as four data words. However, setting the base burst length to a low level places a significant burden on the controller, because when large amounts of data must be accessed, the controller must keep track of a considerable number of items and more states are required in the controller. To write the entire contents of the memory array, for example, either the controller must be designed to send a sequence of commands to write in bursts of four words at a time or have the complexity to adjust the contents of the mode register to change the burst length before beginning the page burst (the former option may be unacceptably slow in many instances, since the initial word accessed from each command requires a full row cycle time (tRC) whereas subsequent words in a burst can typically be accessed in a fraction of the tRC). With the flexibility of the on-the-fly burst mode capability described above, the controller can have the desired data granularity but still have the capability to read or write large quantities of data without incurring the complexity and time penalty of re-writing the mode register such that, even if the basic write command is set to a burst length of four, the write burst command can be set to full page, and a page burst can be accomplished with one command without resetting the mode register.

If the burst length associated with read burst and write burst commands is configurable or programmable, even greater flexibility is possible. For example, if at a certain time, it is advantageous to switch between burst lengths of four and eight, then these two values can be assigned to the respective burst lengths associated with the non-burst read/write commands and the read burst/write burst commands. If, at another time, it is advantageous to switch between burst lengths of sixteen and full page, then these two values can be assigned to the respective burst lengths to achieve rapid on-the-fly switching between these two burst lengths.

The terminate command provides additional flexibility to the on-the-fly burst mode scheme. Specifically, the terminate command causes a burst read or burst write that is in progress to be immediately terminated on the fly. Thus, for example, if the burst length for the burst mode commands is set to large value, such as the full page, burst accesses of arbitrarily shorter lengths can be achieved by appropriately selecting the timing of a subsequent terminate command. Consequently, the combination of the read and write burst commands and the terminate command effectively permits a variable length burst mode without having to re-write the contents of the mode register to select the desired burst length. This functionality is particularly useful where the desired burst length varies frequently among a number of values.

While the foregoing example involves a controller that controls a memory device with particular control bits (i.e., the three control bits CS#, WE# and REF#) that decode in a specific manner into a particular command set, the invention is not limited to any specific number or type of control bits, decoding scheme or command set. In general, the on-the-fly burst mode technique can be implemented using any control or command scheme that includes signals which permit switching between memory access with one burst length and memory access with another burst length without requiring stored parameters that control access to the memory to be changed or reset with a separate command from the controller. Likewise, while reference is made to the feature of not having to re-write or alter the contents of a mode register, it will be appreciated that invention applies generally to avoiding changing memory access parameters when switching burst lengths, regardless of the particular implementation of a mode register or storage unit that contains the memory access parameters.

In the foregoing example, it is assumed that the same burst length is associated with both the read burst command and the write burst command. Optionally, however, on-the-fly burst mode could be implemented with the read burst command having one burst length and the write burst command having another, separate burst length if advantageous in a particular architecture.

The described on-the-fly burst mode technique also is not limited to any particular memory array architecture or addressing scheme. Thus, for example, the technique is equally applicable in memory devices that increment parts of the address for write and read commands.

The on-the-fly burst mode technique permits real time use of full page burst mode without changing mode register. This results in few controller states and less complexity in the controller. Using a small burst length, the controller must cache much more data as it goes through its states to perform several small accesses, thereby requiring a significant cache size. Using on-the-fly full page burst mode offers the possibility of reducing the controller cache size. Further, switching between different burst lengths can be performed more quickly, because no operations need to be carried out to adjust the mode register. Additionally, fewer commands need to be driven over an external bust to the memory device, resulting in power savings.

Having described preferred embodiments of new and improved burst mode implementation in a memory device, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of accessing a memory device, comprising:
providing a set of commands for controlling access to the memory device, wherein the set of commands includes a first memory access command for accessing the memory device using a first programmable burst length and a second memory access command for accessing the memory device using a second programmable burst length, where both said first and second memory access commands commonly comprise a read or write memory access command associated with the same memory port;
maintaining memory access parameters in the memory device associated with memory access commands, wherein the memory access parameters include the first and second programmable burst lengths, and wherein the set of commands includes a set mode command for configuring the memory access parameters;
sending the first memory access command to the memory device to access the memory device using the first programmable burst length stored in the memory device; and sending the second memory access command to the memory device to access the memory device using the second programmable burst length stored in the memory device, wherein the memory device is accessible by switching between the first memory access command using the first programmable burst length and the second memory access command using the second programmable burst length without sending a set mode command to the memory device to change the memory access parameters.

2. The method of claim 1, wherein the first programmable burst length is among the memory access parameters configurable by the set mode command.

3. The method of claim 2, wherein the second programmable burst length is among the memory access parameters configurable by the set mode command.

4. The method of claim 1, wherein the first memory access command is one of a read command and a write command, and the second memory access command is correspondingly one of a read burst command and a write burst command.

5. The method of claim 1, wherein the set of commands includes a terminate command that terminates a current memory access.

6. The method of claim 1, wherein the second memory access command corresponds to a full page burst.

7. A memory device, comprising:
a memory array that is accessible for writing data into the memory array and reading data from the memory array;
a command decoder that decodes input control signals to produce commands for accessing the memory array, wherein the commands produced from the input control signals include: a first memory access command for accessing the memory array using a first programmable burst length and a second memory access command for accessing the memory array using a second programmable burst length, where both said first and second memory access commands commonly comprise a read or write memory access command associated with the same memory port; and
a mode register that stores memory access parameters associated with accessing the memory array, wherein the first and second programmable burst lengths are specified by the memory access parameters in the mode register, and wherein access to the memory array is switchable between the first programmable burst length and the second programmable burst length without altering the memory access parameters in the mode register.

8. The memory device of claim 7, wherein the second memory access command is correspondingly one of a read burst command and a write burst command, wherein the second programmable burst length is greater than the first programmable burst length.

9. The memory device of claim 7, wherein the memory device is a dynamic random access memory (DRAM).

10. The memory device of claim 7, wherein the commands produced from the input control signals further include a terminate command that terminates a current memory access.

11. The memory device of claim 7, wherein the second memory access command corresponds to a full page burst.

12. The memory device of claim 7, further comprising:
an address latch/counter module that receives an input address associated with the first memory access command or the second memory access command and supplies addresses to the memory array during memory access in accordance with a specified burst length.

13. A memory device, comprising:
means for storing data that is accessible for writing data in and reading data out;
means for processing input control signals to produce commands for accessing the means for storing data, wherein the commands produced from the input control signals include: a first memory access command for accessing the means for storing data using a first programmable burst length and a second memory access command for accessing the means for storing data using a second programmable burst length, where both said first and second memory access commands commonly comprise a read or write memory access command associated with the same memory port; and
means for storing memory access parameters associated with accessing the means for storing data, wherein the first and second programmable burst lengths are specified by the memory access parameters, and wherein access to the means for storing data is switchable between the first programmable burst length and the second programmable burst length without altering the memory access parameters.

14. The memory device of claim 13, wherein the second memory access command is correspondingly one of a read burst command and a write burst command, wherein the second programmable burst length is greater than the first programmable burst length.

15. The memory device of claim 13, wherein the memory device is a dynamic random access memory (DRAM).

16. The memory device of claim 13, wherein the commands produced from the input control signals further include a terminate command that terminates a current memory access.

17. The memory device of claim 13, wherein the second memory access command corresponds to a full page burst.

18. The memory device of claim 13, further comprising:
means for receiving an input address associated with the first memory access command or the second memory access command and for supplying addresses to the means for storing data during memory access in accordance with a specified burst length.

19. A memory device, comprising:
a memory array that is accessible for writing data into the memory array and reading data from the memory array;
a mode register that stores memory access parameters associated with accessing the memory array, including a first programmable burst length and a second programmable burst length, where both said first and second memory access commands commonly comprise a read or write memory access command associated with the same memory port; and
a command decoder that decodes input control signals to produce commands for accessing the memory array;
wherein the commands include: a first memory access command for accessing the memory array using the first programmable burst length specified by the memory access parameters in the mode register; and a second memory access command for accessing the memory array using the second programmable burst length, wherein access to the memory array is switchable between the first burst length and the second burst length without altering the memory access parameters in the mode register.

20. The memory device of claim 19, wherein the commands include a read command and a write command that access the memory array using the first programmable burst length, and a read burst command and a write burst command that access the memory array using the second programmable burst length.

21. A controller for controlling a memory device, comprising:
- a memory management module that manages access to the memory device, wherein memory access parameters associated with memory access commands are maintained in the memory device, the memory access parameters including a first programmable burst length and a second programmable burst length; and
- a command generator module that generates commands for accessing the memory module in accordance with the memory management module, wherein the commands include: a first memory access command for accessing the memory device using the first programmable burst length, a second memory access command for accessing the memory array using the second programmable burst length, where both said first and second memory access commands commonly comprise a read or write memory access command associated with the same memory port, and a set mode command for configuring the memory access parameters, wherein the memory device is accessible by switching between the first memory access command using the first burst length and the second memory access command using the second burst length without sending a set mode command to the memory device to change the memory access parameters.

22. The controller of claim 21, wherein the first programmable burst length is among the memory access parameters configurable by the set mode command.

23. The controller of claim 22, wherein the second programmable burst length is among the memory access parameters configurable by the set mode command.

24. The controller of claim 21, wherein the first memory access command is one of a read command and a write command, and the second memory access command is correspondingly one of a read burst command and a write burst command.

25. The controller of claim 21, wherein the commands generated by the command generator module include a terminate command that terminates a current memory access.

26. The controller of claim 21, wherein the second memory access command corresponds to a full page burst.

* * * * *